US012791523B2

(12) United States Patent
Skoglund et al.

(10) Patent No.: US 12,791,523 B2
(45) Date of Patent: Nov. 10, 2026

(54) ULTRASOUND SCANNING SYSTEM COMPRISING MULTIPLE 2D ARRAYS

(71) Applicant: DolphiTech AS, Gjovik (NO)

(72) Inventors: Eskil Skoglund, Gjovik (NO); Thong Huynh, Gjovik (NO); Oyvind Syljuasen, Gjovik (NO); Fredrik Lingvall, Gjovik (NO); Tore Magne Skar, Gjovik (NO); Fredrik Brynhildsvoll, Gjovik (NO); Yngve Raudberget, Gjovik (NO); Heidi Rognstad, Gjovik (NO)

(73) Assignee: DolphiTech AS, Gjøvik (NO)

( * ) Notice: Subject to any disclaimer, the term of this patent is extended or adjusted under 35 U.S.C. 154(b) by 307 days.

(21) Appl. No.: 18/574,992

(22) PCT Filed: Jun. 28, 2022

(86) PCT No.: PCT/EP2022/067800
§ 371 (c)(1),
(2) Date: Dec. 28, 2023

(87) PCT Pub. No.: WO2023/275092
PCT Pub. Date: Jan. 5, 2023

(65) Prior Publication Data

US 2024/0353373 A1 Oct. 24, 2024

(30) Foreign Application Priority Data

Jun. 30, 2021 (GB) ..................................... 2109495

(51) Int. Cl.
*G01N 29/06* (2006.01)
*G01N 29/11* (2006.01)
*G01N 29/265* (2006.01)

(52) U.S. Cl.
CPC ......... *G01N 29/0654* (2013.01); *G01N 29/11* (2013.01); *G01N 29/265* (2013.01);
(Continued)

(58) Field of Classification Search
None
See application file for complete search history.

(56) References Cited

U.S. PATENT DOCUMENTS 4,699,007 A 10/1987 Kawashima et al.
5,079,951 A 1/1992 Raymond et al.
(Continued)

OTHER PUBLICATIONS

International Preliminary Opinion in International Appln. No. PCT/EP2022/067800, mailed on Jan. 11, 2024, 10 pages.
(Continued)

*Primary Examiner* — Suman K Nath
(74) *Attorney, Agent, or Firm* — Fish & Richardson P.C.

(57) ABSTRACT

A scanning system for imaging structural features below the surface of an object, the scanning system comprising a controller for interfacing with a plurality of transducer modules; a first transducer module coupled to the controller and comprising a first 2D array configured to transmit ultrasound signals towards an object under control of the controller; and a second transducer module coupled to the controller and comprising a second 2D array configured to receive ultrasound signals transmitted by the first transducer module that pass through the object whereby data pertaining to an internal structure of the object can be obtained.

20 Claims, 11 Drawing Sheets

(52) U.S. Cl.
CPC ................ *G01N 2291/0289* (2013.01); *G01N 2291/106* (2013.01)

(56) References Cited

U.S. PATENT DOCUMENTS

| | | | | |
|---|---|---|---|---|
| 6,032,534 | A * | 3/2000 | Sherwin | G01N 29/4436 73/628 |
| 2006/0058656 | A1* | 3/2006 | Kristoffersen | G01S 7/5203 600/437 |
| 2006/0201252 | A1* | 9/2006 | Georgeson | G01N 29/2481 73/641 |
| 2007/0118313 | A1 | 5/2007 | Vaccaro | |
| 2009/0277269 | A1* | 11/2009 | Sarr | G01N 29/265 73/620 |
| 2015/0369909 | A1 | 12/2015 | Lasser et al. | |
| 2016/0095579 | A1 | 4/2016 | Smith et al. | |
| 2017/0074978 | A1 | 3/2017 | Miller et al. | |
| 2017/0209121 | A1 | 7/2017 | Davis, Sr. et al. | |

OTHER PUBLICATIONS

International Search Report and Written Opinion in International Appln. No. PCT/EP2022/067800, mailed on Jan. 9, 2022, 12 pages.

* cited by examiner

ULTRASOUND SCANNING SYSTEM COMPRISING MULTIPLE 2D ARRAYS

CROSS-REFERENCE TO RELATED APPLICATIONS

The present application is the national stage entry of International Patent Application No. PCT/EP2022/067800, filed on Jun. 28, 2022, and claims priority to Application No. GB2109495.8, filed in the United Kingdom filed on Jun. 30, 2021, the disclosures of which are hereby incorporated herein by reference thereto.

FIELD OF THE INVENTION

This invention relates to a scanning system for imaging structural features below the surface of an object, which comprises a controller and multiple transducer modules, each transducer module having a 2D array.

BACKGROUND

A scanning system typically includes a transducer module. The transducer module is for imaging an object, for instance for imaging structural features below an object's surface. The transducer module may be particularly useful for imaging sub-surface material defects such as delamination, debonding and flaking.

Ultrasound can be used to identify particular structural features in an object. For example, ultrasound may be used for non-destructive testing by detecting the size and position of flaws in a sample. There are a wide range of applications that can benefit from non-destructive testing, covering different materials, sample depths and types of structural feature, such as different layers in a laminate structure, impact damage, boreholes etc. Ultrasound is an oscillating sound pressure wave that can be used to detect objects and measure distances. A transmitted sound wave is reflected and refracted as it encounters materials with different acoustic impedance properties. If these reflections and refractions are detected and analysed, the resulting data can be used to describe the environment through which the sound wave travelled.

Ultrasound systems can operate in pulse-echo or through-transmission modes. In a pulse-echo mode, a pulse (comprising one or more ultrasound signals) is transmitted towards an object and reflections of that pulse are received from the object. A single transducer may both transmit and receive in this mode, or a transmitter can transmit the pulse and a separate receiver can receive the reflections of that pulse. In a through-transmission mode, a pulse is transmitted towards an object and ultrasound signals that are transmitted through that object are received at a receiver located to the other side of the object from the transmitter. To enhance the quality of data obtained in the through-transmission mode, it is desirable to avoid energy losses between the transmitter and the receiver. That is, it is desirable for a scanning system to be arranged such that a relatively greater amount of the transmitted ultrasound is received at the receiver.

SUMMARY

According to an aspect of the present invention, there is provided a scanning system for imaging structural features below the surface of an object, the scanning system comprising:

- a controller for interfacing with a plurality of transducer modules;
- a first transducer module coupled to the controller and comprising a first 2D array configured to transmit ultrasound signals towards an object under control of the controller; and
- a second transducer module coupled to the controller and comprising a second 2D array configured to receive ultrasound signals transmitted by the first transducer module that pass through the object whereby data pertaining to an internal structure of the object can be obtained.

The first 2D array may be configured to receive ultrasound signals from the object whereby data pertaining to an internal structure of the object can be obtained. The second 2D array may be configured to transmit further ultrasound signals towards the object under control of the controller.

The controller may comprise a trigger signal generator for generating a trigger signal, and the first transducer module may be configured to transmit the ultrasound signals in response to receiving the trigger signal. The second transducer module may be configured, in response to receiving the trigger signal, to receive the ultrasound signals transmitted by the first transducer module.

The controller may comprise a signal analyser configured to analyse the received ultrasound signals and to output an analysis signal, and the controller may be configured to further analyse the received ultrasound signals based on the analysis signal. The signal analyser may comprise a threshold detector configured to detect the signal amplitude of the received ultrasound signals and to compare the signal amplitude with a threshold amplitude, and to output the analysis signal in dependence on the comparison. The signal analyser may be configured to identify a feature in the received ultrasound signals and to output the analysis signal in dependence on the identified feature. The threshold detector may be configured to detect the amplitude of the identified feature.

The signal analyser may comprise a position detector configured to detect a first transducer position of the first transducer module and a second transducer position of the second transducer module, and to output the analysis signal in dependence on the first transducer position and the second transducer position.

The signal analyser may comprise an overlap detector configured to detect an overlap in the lateral extent of the first transducer module and the second transducer module, based on an analysis of the received ultrasound signals and/or the first transducer position and the second transducer position.

The controller may be configured to further analyse received ultrasound signals based on one or more of: detecting that an amplitude of a peak in the received ultrasound signals meets or exceeds a threshold amplitude; detecting that an overlap between the first transducer module and the second transducer module meets or exceeds a threshold overlap; and detecting that a measure of alignment between the first transducer module and the second transducer module meets or exceeds a threshold measure of alignment.

According to another aspect of the present invention, there is provided a method of imaging structural features below the surface of an object, the method comprising:

- transmitting ultrasound signals, using a first 2D array of a first transducer module, towards an object, under control of a controller;

receiving ultrasound signals transmitted by the first transducer module that pass through the object, using a second 2D array of a second transducer module; and analysing the received ultrasound signals to obtain data pertaining to an internal structure of the object.

Any one or more feature of any aspect above may be combined with any other aspect. These have not been written out in full here merely for the sake of brevity.

BRIEF DESCRIPTION OF THE DRAWINGS

The present invention will now be described by way of example with reference to the accompanying drawings. In the drawings.

DETAILED DESCRIPTION

Figure 1:
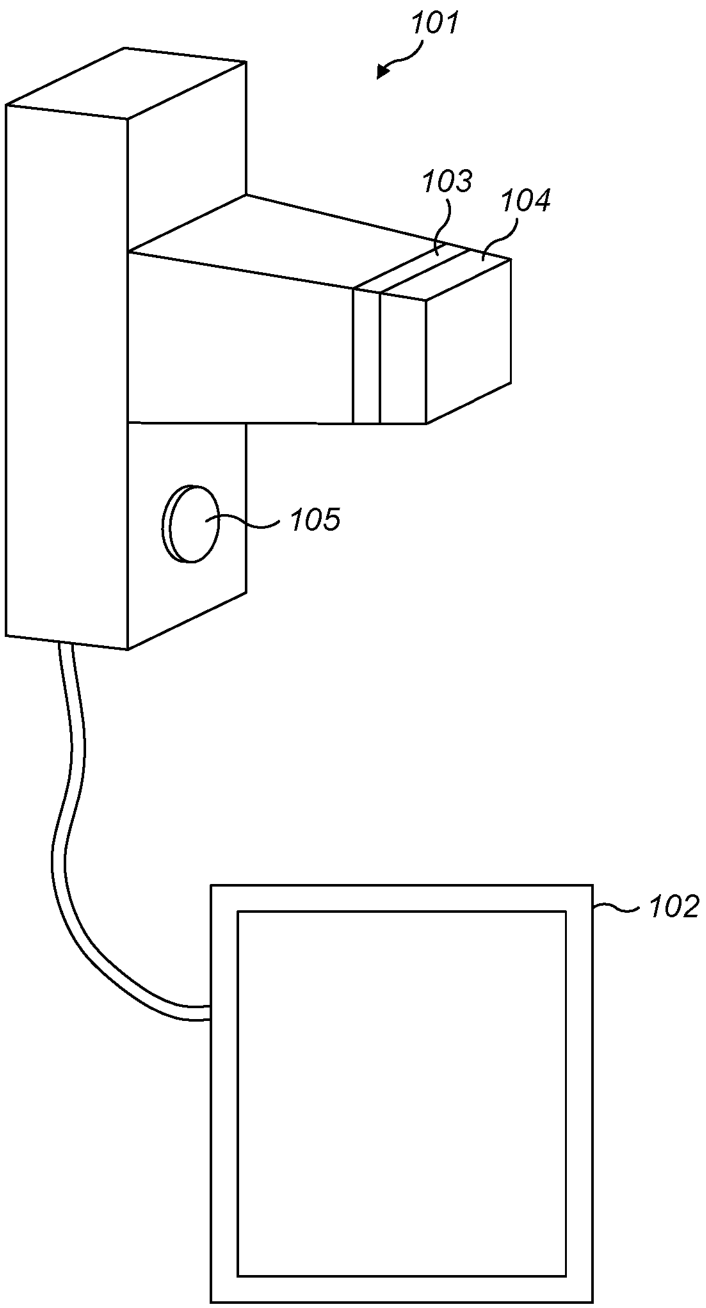
FIG. 1 shows a device for imaging an object.

A scanning system can transmit sound pulses towards an object to be imaged, and receive sound pulses from the object, so as to image the object. The received sound pulses can be reflected from the object or transmitted through the object. The received sound pulses may be both reflected from the object and transmitted through the object.

In the through-transmission mode, alignment issues can reduce the quality of the data obtained in the ultrasound scan. For example, where the receiver does not directly face the transmitter, there can be a reduction in the amplitude of the received signal compared to the situation where the receiver directly faces the transmitter. Further, where there is an angle between the direction in which the transmitter transmits and the direction in which the receiver receives, there can be a reduction in the amplitude of the received signal compared to the situation where the transmitting direction and the receiving direction are aligned with one another.

It is therefore desirable to provide a scanning system in which alignment issues can be ameliorated. A scanning system can comprise a plurality of transducer modules each coupled to a controller for interfacing with the transducer modules and for controlling the transducer modules. Each of the transducer modules comprises a 2D array. One transducer module can act as a transmitter in the through-transmission mode, and the other transducer module can act as a receiver in the through-transmission mode. The 2D array of the transmitter can transmit ultrasound signals towards an object under control of the controller. The 2D array of the receiver can receive ultrasound signals transmitted by the transmitter that pass through the object whereby data pertaining to an internal structure of the object can be obtained. Suitably one or both of the 2D arrays is a matrix array, such as described herein.

The transducer module acting as the transmitter in the through-transmission mode can comprise an ultrasound transmitter and optionally an ultrasound receiver. Suitably the transducer module acting as the transmitter comprises an ultrasound transceiver that is capable of both transmitting and receiving ultrasound signals. The transducer module acting as the receiver in the through-transmission mode can comprise an ultrasound receiver and optionally an ultrasound transmitter. Suitably the transducer module acting as the receiver comprises an ultrasound transceiver that is capable of both transmitting and receiving ultrasound signals. Providing at least one, and preferably both, of the transducer modules with ultrasound transceivers can increase the flexibility of the system and can permit the through-transmission mode to be used in conjunction with the pulse-echo mode. This configuration can enhance the operational usefulness of the scanning system.

A scanning system in accordance with this approach will be described in more detail below.

A scanning system typically gathers information about structural features located different depths below the surface of an object. One way of obtaining this information is to transmit sound pulses at the object and detect sound that has passed through the object. It is helpful to generate an image depicting the gathered information so that a human operator can recognise and evaluate the size, shape and depth of any structural flaws below the object's surface. This is a vital activity for many industrial applications where sub-surface structural flaws can be dangerous. An example is aircraft maintenance.

Usually the operator will be entirely reliant on the images produced by the apparatus because the structure the operator wants to look at is beneath the object's surface. It is therefore important that the information is imaged in such a way that the operator can evaluate the object's structure effectively.

Ultrasound transducers make use of a piezoelectric material, which is driven by electrical signals to cause the piezoelectric material to vibrate, generating the ultrasound signal. Conversely, when a sound signal is received, it causes the piezoelectric material to vibrate, generating electrical signals which can be detected.

The ultrasound signals received by the transducer can be analysed based on their amplitude and time-of-flight. The data can be used to generate B-scan images, typically showing a slice through the object being scanned, and/or C-scan images, typically showing a planar representation of the object. Where, in a through-transmission mode, the object's thickness is constant, for example where the object has front and rear surfaces that are planar and parallel to each other, the B-scan image (or simply 'B-scan') and the C-scan image (or simply 'C-scan') can readily be analysed. Where the thickness of the object is not constant across its width, for example due to non-planar surfaces and/or planar front and rear surfaces that are not parallel to one another, the analysis is more complicated. In such cases, the analysis will need to take account of the changes in thickness of the object at different positions as well as the surface and sub-surface features at those positions, which may both cause signal amplitude variations.

A scanning system can determine the position and/or alignment of two transducer modules in a through-transmission mode and can thereby better be able to analyse the data obtained during an ultrasound scan. The determination of the position and/or alignment of the two transducer modules can be performed contemporaneously with the scanning of the object, enabling more accurate real-time analysis.

Described herein is a scanning system for imaging structural features below the surface of an object. The scanning system comprises a controller for interfacing with a plurality of transducer modules, a first transducer module and a second transducer module. The first transducer module is coupled to the controller. The first transducer module comprises a first 2D array configured to transmit ultrasound signals towards an object. The first transducer module is suitably under control of the controller, for example the transmission of the ultrasound signals by the first 2D array is suitably under control of the controller. The second transducer module is also coupled to the controller. The second transducer module comprises a second 2D array configured to receive ultrasound signals transmitted by the first transducer module that pass through the object whereby data pertaining to an internal structure of the object can be obtained.

The first 2D array may also be configured to receive ultrasound signals from the object whereby data pertaining to an internal structure of the object can be obtained. This arrangement enables use of the pulse-echo mode of ultrasound analysis. This arrangement, in which both the through-transmission mode and the pulse-echo mode can be used, can increase the flexibility of the scanning system. In such a scanning system, detection of reflected ultrasound signals and/or transmitted ultrasound signals can be performed at once enabling a greater range of data pertaining to an object's subsurface structure to be obtained during a single scan.

The second 2D array is suitably configured to transmit further ultrasound signals towards the object under control of the controller. The second transducer module can be configured to receive reflections of the further ultrasound signals (i.e. to operate in a pulse-echo mode). The first 2D array of the first transducer module is suitably configured to receive the further ultrasound signals transmitted by the second transducer module that pass through the object.

Thus this arrangement permits either the first transducer module or the second transducer module (or both) operate in the pulse-echo mode. This arrangement further permits the through-transmission mode in which ultrasound signals can be transmitted by the first transducer module and received by the second transducer module, or transmitted by the second transducer module and received by the first transducer module, or both ways round.

Further detail of a scanning system in accordance with techniques relating to 2D array through-transmission ultrasound scanning is described below with reference to the figures.

An example of a handheld device, such as a scanning system described herein, for imaging below the surface of an object is shown in FIG. 1. The device 101 could have an integrated display, but in this example it outputs images to a tablet computer 102. The connection with the tablet could be wired, as shown, or wireless. The device has a matrix array 103 for transmitting and receiving ultrasound signals. Suitably the array is implemented by an ultrasound transducer comprising a plurality of electrodes arranged in an intersecting pattern to form an array of transducer elements. The transducer elements may be switched between transmitting and receiving. The handheld apparatus as illustrated comprises a coupling layer such as a dry coupling layer 104 for coupling ultrasound signals into the object. The coupling layer also delays the ultrasound signals to allow time for the transducers to switch from transmitting to receiving. The coupling layer need not be provided in all examples. The scanning system can comprise a coupling shoe attached to the front of the transducer.

The matrix array 103 is two dimensional so there is no need to move it across the object to obtain an image. A typical matrix array might be approximately 30 mm by 30 mm but the size and shape of the matrix array can be varied to suit the application. The device may be straightforwardly held against the object by an operator. Commonly the operator will already have a good idea of where the object might have sub-surface flaws or material defects; for example, a component may have suffered an impact or may comprise one or more drill or rivet holes that could cause stress concentrations. The device suitably processes the reflected pulses in real time so the operator can simply place the device on any area of interest.

The handheld device also comprises a dial 105 or other user input device that the operator can use to change the pulse shape and corresponding filter. In other examples the dial need not be provided. Selection of the pulse shape and/or filter can be made in software. The most appropriate pulse shape may depend on the type of structural feature being imaged and where it is located in the object. The operator can view the object at different depths by manually adjusting the time-gating via the display. Having the apparatus output to a handheld display, such as the tablet 102, or to an integrated display, is advantageous because the operator can readily move the transducer over the object, or change the settings of the apparatus, depending on what is seen on the display and get instantaneous results. In other arrangements, the operator might have to walk between a non-handheld display (such as a PC) and the object to keep rescanning it every time a new setting or location on the object is to be tested.

Figure 2:
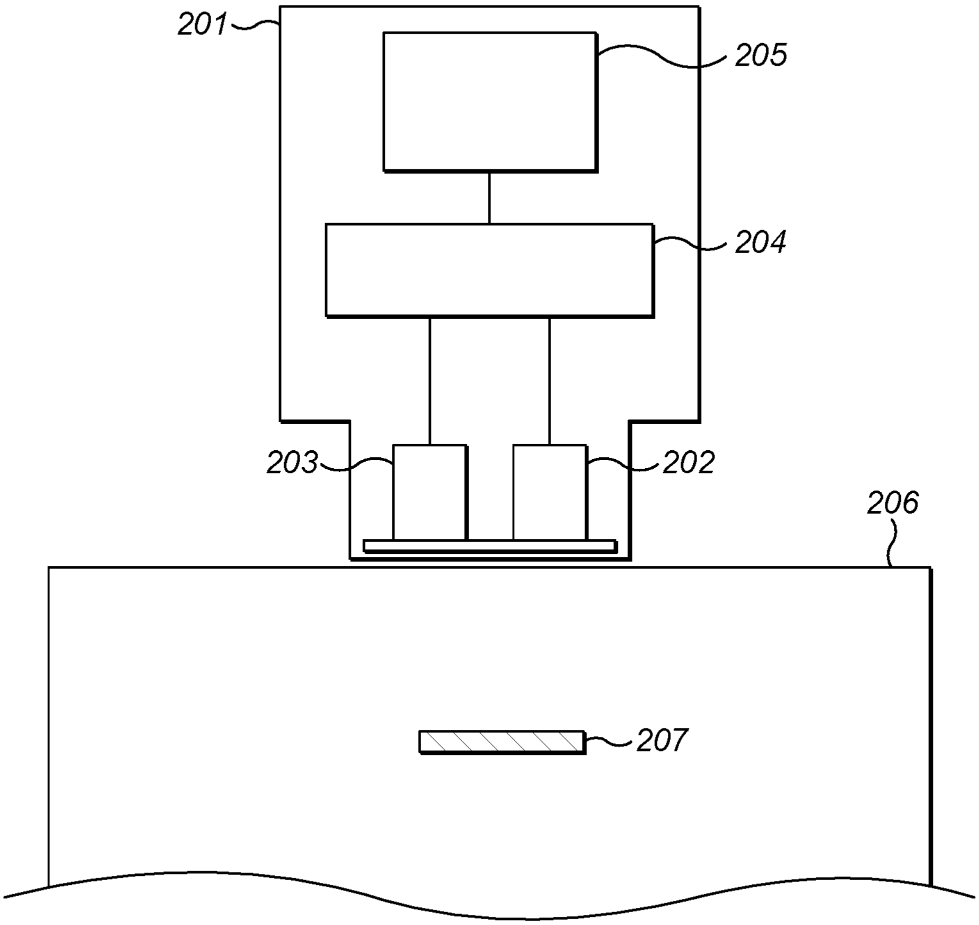
FIG. 2 shows an example of a scanning system and an object.

A scanning system for imaging structural features below the surface of an object is shown in FIG. 2. The apparatus, shown generally at 201, comprises a transmitter 202, a receiver 203, a signal processor 204 and an image generator 205. In some examples the transmitter and receiver may be implemented by an ultrasound transducer. The transmitter and receiver are shown next to each other in FIG. 2 for ease of illustration only. The transmitter 202 is suitably configured to transmit a sound pulse having a particular shape at the object to be imaged 206. The receiver 203 is suitably configured to receive reflections of transmitted sound pulses from the object. A sub-surface feature of the object is illustrated at 207.

Figure 3:
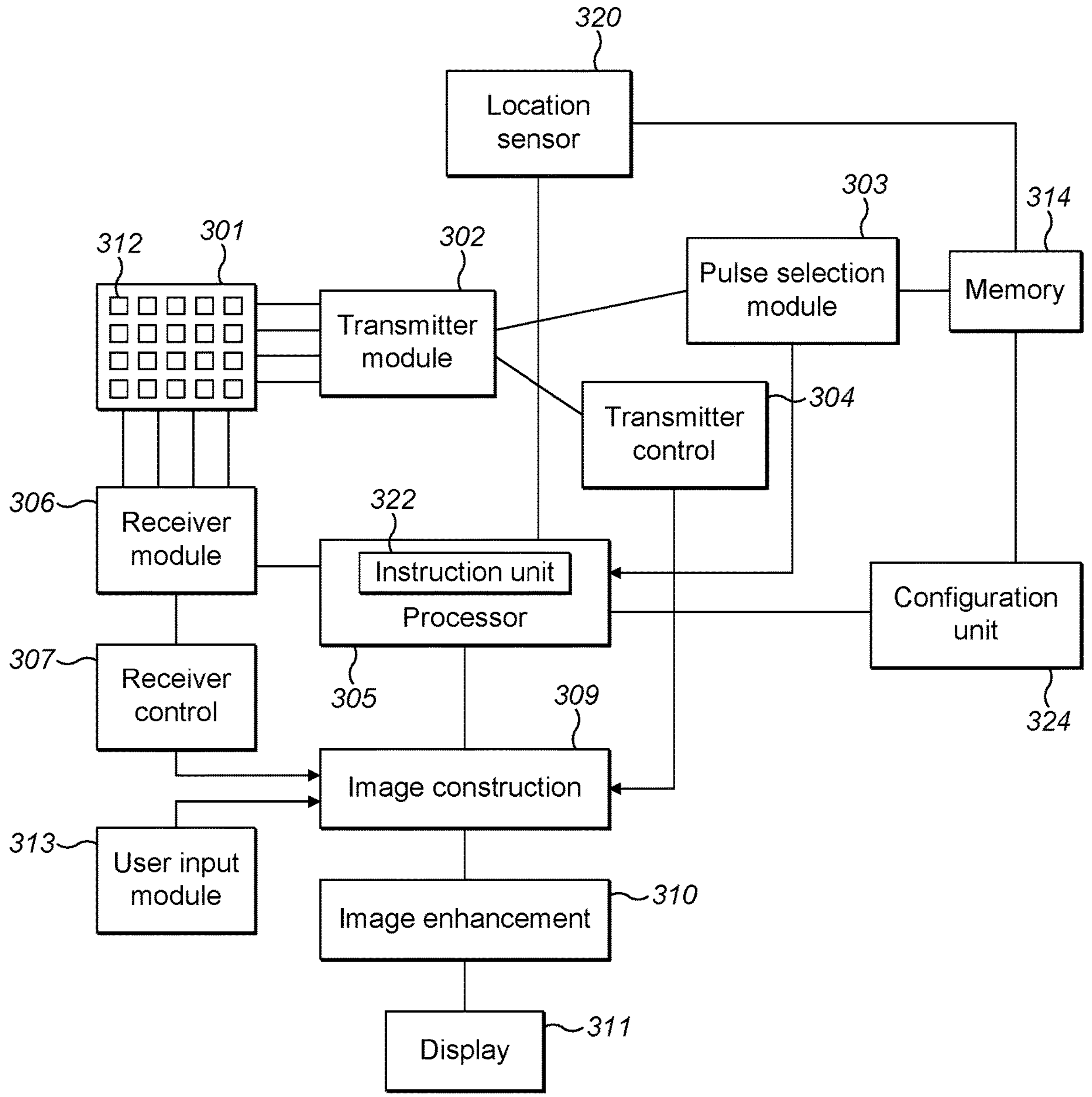
FIG. 3 shows an example of the functional blocks of a scanning system.

An example of the functional blocks comprised in one embodiment of the apparatus are shown in FIG. 3. In this example the transmitter and receiver are implemented by an ultrasound transducer 301, which comprises a matrix array of transducer elements 312. The transducer elements transmit and/or receive ultrasound waves. The matrix array may comprise a number of parallel, elongated electrodes arranged in an intersecting pattern; the intersections form the transducer elements. The transmitter electrodes are connected to the transmitter module 302, which supplies a pulse pattern with a particular shape to a particular electrode. The transmitter control 304 selects the transmitter electrodes to be activated. The number of transmitter electrodes that are activated at a given time instant may be varied. The transmitter electrodes may be activated in turn, either individually or in groups. Suitably the transmitter control causes the transmitter electrodes to transmit a series of sound pulses into the object, enabling the generated image to be continuously updated. The transmitter electrodes may also be controlled to transmit the pulses using a particular frequency. The frequency may be between 100 kHz and 30 MHz, preferably it is between 0.5 MHz and 15 MHz and most preferably it is between 0.5 MHz and 10 MHz.

The receiver electrodes sense sound waves that are emitted from the object. These sound waves are reflections of the sound pulses that were transmitted into the object. The receiver module receives and amplifies these signals. The signals are sampled by an analogue-to-digital converter. The receiver control suitably controls the receiver electrodes to receive after the transmitter electrodes have transmitted. The apparatus may alternately transmit and receive. In one embodiment the electrodes may be capable of both transmitting and receiving, in which case the receiver and transmitter controls will switch the electrodes between their transmit and receive states. There is preferably some delay between the sound pulses being transmitted and their reflections being received at the apparatus. The apparatus may include a coupling layer (such as the dry coupling and/or as provided by the coupling shoe) to provide the delay needed for the electrodes to be switched from transmitting to receiving. Any delay may be compensated for when the relative depths are calculated. The coupling layer preferably provides low damping of the transmitted sound waves.

Each transducer element may correspond to a pixel in the image. In other words, each pixel may represent the signal received at one of the transducer elements. This need not be a one-to-one correspondence. A single transducer element may correspond to more than one pixel and vice-versa. Each image may represent the signals received from one pulse. It should be understood that "one" pulse will usually be transmitted by many different transducer elements. These versions of the "one" pulse might also be transmitted at different times, e.g. the matrix array could be configured to activate a "wave" of transducer elements by activating each line of the array in turn. This collection of transmitted pulses can still be considered to represent "one" pulse, however, as it is the reflections of that pulse that are used to generate a single image of the sample. The same is true of every pulse in a series of pulses used to generate a video stream of images of the sample.

The pulse selection module 303 selects the particular pulse shape to be transmitted. It may comprise a pulse generator, which supplies the transmitter module with an electronic pulse pattern that will be converted into ultrasonic pulses by the transducer. The pulse selection module may have access to a plurality of predefined pulse shapes stored in a memory 314. The pulse selection module may select the pulse shape to be transmitted automatically or based on user input. The shape of the pulse may be selected in dependence on the type of structural feature being imaged, its depth, material type etc. In general the pulse shape should be selected to optimise the information that can be gathered by the signal processor 305 and/or improved by the image enhancement module 310 in order to provide the operator with a quality image of the object.

Figure 4:
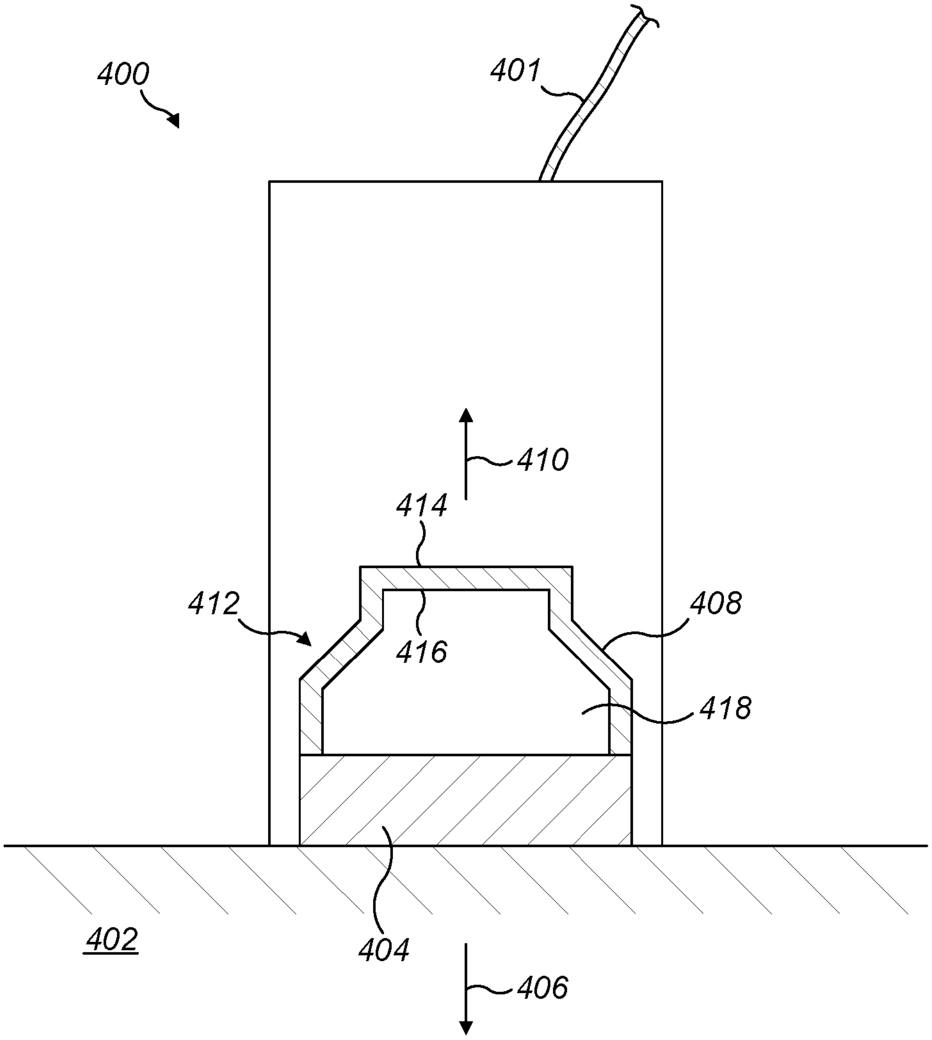
FIG. 4 shows a schematic illustration of a transducer module.

FIG. 4 schematically illustrates a transducer module. The transducer module (TRM) is generally indicated at 400. An electrical connection such as a cable 401 couples the TRM to a remote system, such as a controller. The remote system can provide driving signals and can receive detected signals. The transducer module is shown as being placed against an object under test 402. The TRM comprises a transducer 404. The transducer 404 comprises a transmitter. The transducer comprises a receiver. The transmitter and receiver may be separately provided or may both be provided as part of an ultrasound transceiver. Details of the transducer structure and its electrical connections are omitted from this figure for clarity. The transducer is configured to transmit ultrasound signals towards the object to be imaged. The transducer is suitably configured to transmit ultrasound signals in a direction indicated at 406.

Figure 5:
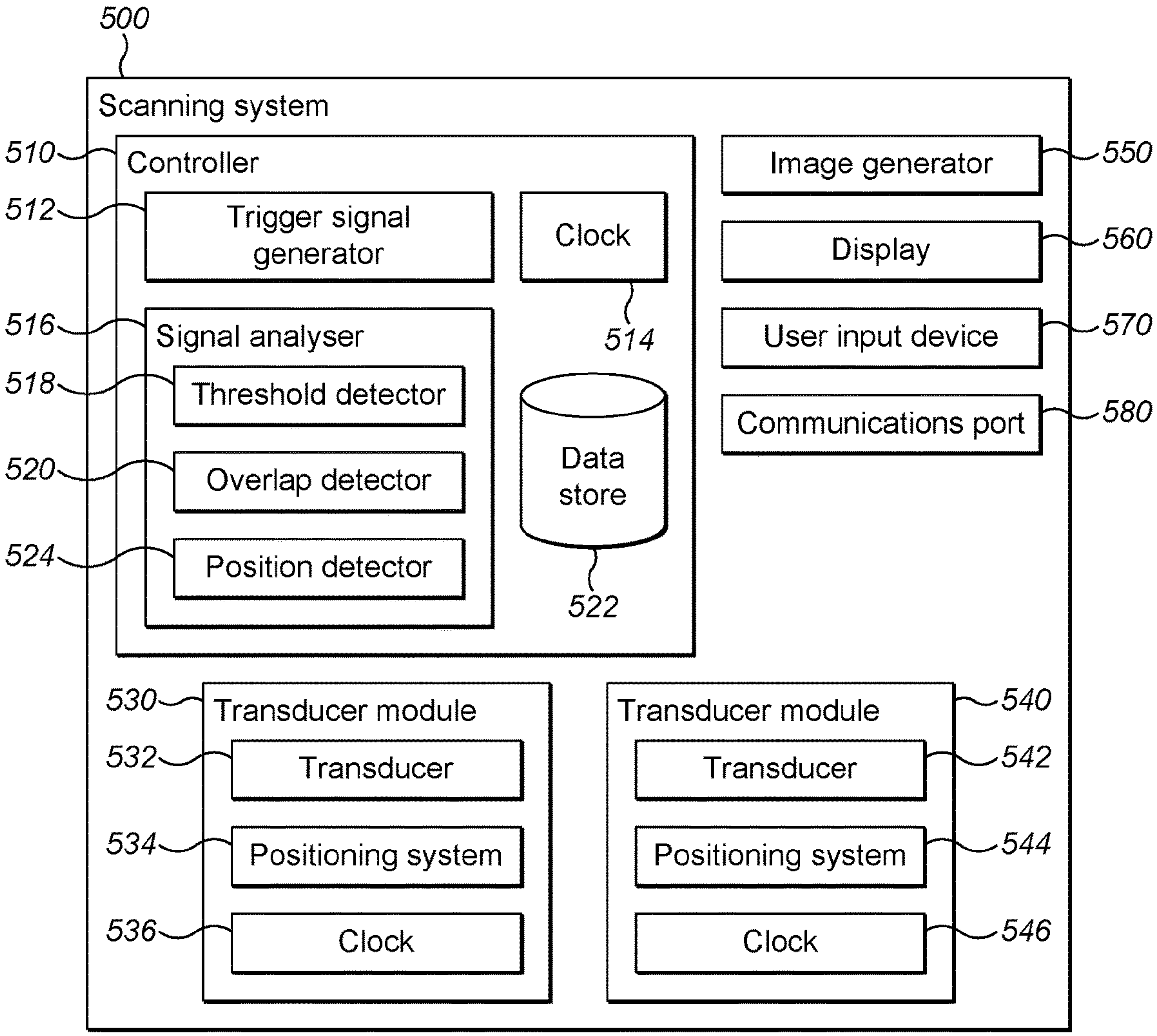
FIG. 5 shows a block diagram of a scanning system.

A scanning system will now be described with reference to FIG. 5. The scanning system is generally indicated at 500. The scanning system comprises a controller 510, a first transducer module 530, and a second transducer module 540. The scanning system 500 may further comprise one or more of an image generator 550, a display 560, a user input device 570 and a communications port 580.

The controller 510 is coupled to both of the first transducer module 530 and the second transducer module 540. Suitably, as described herein, each transducer module 530, 540 is configured to transmit ultrasound signals towards an object and to receive ultrasound signals reflected from and/or transmitted through the object. This permits data pertaining to an internal structure of the object to be obtained.

The first transducer module 530 comprises a first transducer 532. The first transducer 532 comprises a 2D array of elements, for example a matrix array. The first transducer module 530 may further comprise a first positioning system 534 and/or a first clock 536. The first positioning system 534 suitably comprises a local positioning system. The first positioning system 534 may comprise a remote positioning system.

The second transducer module 540 comprises a second transducer 542. The second transducer 542 comprises a 2D array of elements, for example a matrix array. The second transducer module 540 may further comprise a second positioning system 544 and/or a second clock 546. The second positioning system 544 suitably comprises a local positioning system. The second positioning system 544 may comprise a remote positioning system.

As mentioned the controller 510 is coupled to the first transducer module and the second transducer module. The controller is configured to control the transmission of ultrasound by one or both of the first transducer module and the second transducer module. The controller comprises a trigger signal generator 512 for generating trigger signals. The scanning system is suitably configured such that a trigger signal generated by the trigger signal generator 512 can trigger the transmission of ultrasound signals by one or both of the first transducer module 530 and the second transducer module 540. For example, one or both of the first transducer module and the second transducer module is configured to transmit ultrasound signals in response to receiving the trigger signal. The scanning system 500 may be configured such that on receipt of the trigger signal at a transducer module, that transducer module then immediately transmits a pulse, or more than one pulse, of ultrasound signals.

The controller 510 suitably comprises a controller clock 514. The trigger signal generated by the trigger signal generator 512 may indicate that an ultrasound pulse is to be triggered at a particular time according to a reference clock rather than on receipt of the trigger signal. For example, the trigger signal generator 512 can access the controller clock 514 and can select an absolute time at which an ultrasound pulse is to be triggered or a number of clock cycles after which an ultrasound pulse is to be triggered. On receipt of the trigger signal at a transducer module 530, 540, reference can be made to the local clock 536, 546, and the ultrasound pulse triggered in dependence on the received trigger signal and the local clock. The controller clock 514 may be synchronised with the first clock 536 at the first transducer module 530. The controller clock 514 may be synchronised with the second clock 546 at the second transducer module 540. Additionally or alternatively, one or more of the controller, the first transducer module and the second transducer module can access a remote clock. Thus a local clock need not be provided in all instances at each of the controller, the first transducer module and the second transducer module. However, it is convenient if a local clock is provided to avoid synchronisation issues when connecting to a remote clock.

The second transducer module 540 is suitably configured to receive the ultrasound signals transmitted by the first transducer module 530 in response to receiving the trigger signal from the controller 510. The trigger signal received at the first transducer module causes transmission of the ultrasound signals. The trigger signal received at the second transducer module can cause the second transducer module to awake from a sleep state or otherwise become ready for receiving the ultrasound signals transmitted by the first transducer module. Configuring the second transducer module such that it captures ultrasound signals in response to receiving the trigger signal can lead to a power saving since the second transducer module need not continually listen for ultrasound signals where the first transducer module is not transmitting ultrasound signals.

Additionally or alternatively, configuring the second transducer module to receive ultrasound signals in response to the trigger signal received from the controller can improve the quality of the data captured by the second transducer module. After transmission by the first transducer module of the ultrasound signals there will be an optimal time window in which the second transducer module can receive the transmitted ultrasound signals. Before this time window, the second transducer module will not receive any ultrasound signals that represent the object disposed between the transducer modules. After this time window, the second transducer module may receive additional ultrasound signals, but these may represent multiple reflections within the object and so may be very weak signals with a lower signal to noise ratio. Thus, to improve the overall signal to noise ratio of the signals received by the second transducer module, the time window in which the second transducer module is configured to actively receive transmitted signals can be set in dependence on the trigger signal generated by the controller, in response to which the first transducer module transmits the ultrasound signals.

The controller is suitably configured to receive ultrasound signals from one or both of the first transducer module and the second transducer module. The controller 510 comprises a signal analyser 516. The controller 510 comprises a data store 522. The signal analyser 516 can analyse received ultrasound signals. The signal analyser 516 is suitably configured to identify one or more features in the received ultrasound signals, for example an echo representative of a front wall surface, an echo representative of a back wall surface, or an echo representative of a feature within the interior of the object such as a defect or boundary within the object. The signal analyser 516 may be configured to identify a peak in the received ultrasound signals that characterises a known feature of the object or an expected feature of the object. For example, where the object comprises a laminate, the known feature may comprise a boundary within the laminate structure.

The signal analyser 516 is suitably configured to identify a feature in the received ultrasound signals based on one or more of:

- a material of an object for scanning;
- a structure of an object for scanning such as the object's surface profile and/or thickness;
- a depth of a feature of interest;
- a flaw or type of flaw to be investigated, such as a crack, stress fracture, delamination, and so on; and
- a coupling medium to be used between the transducer module and an object for scanning.

The signal analyser 516 is suitably configured to identify a feature in the received ultrasound signals based on a characteristic of the received signals, such as an amplitude of a peak, a width of a peak, signal-to-noise ratio, peak separation, type of feature and so on.

The signal analyser 516 is configured to output an analysis signal. The analysis signal is suitably representative of the analysis carried out by the signal analyser. The signal analyser 516 is configured to output the analysis signal in dependence on the identified feature. The controller can be configured to further analyse the received ultrasound signals based on the analysis signal.

The signal analyser 516 comprises a threshold detector 518 and an overlap detector 520.

The threshold detector is configured to detect the signal amplitude of the received ultrasound signals, or of at least one peak or feature in the received ultrasound signals, such as the identified feature, and to compare the signal amplitude with a threshold amplitude. The threshold detector is configured to output the analysis signal in dependence on the comparison.

The threshold amplitude is suitably based on one or more of:

- a material of an object for scanning;
- a structure of an object for scanning;
- a depth of a feature of interest;
- a flaw to be investigated;
- a thickness of an object for scanning;
- a coupling medium to be used between the transducer module and an object for scanning;
- a characteristic of the transducer module (such as one or more of transducer resolution, transducer frequency, transducer frequency range, transducer size, and so on); and
- a threshold selection value, which may be provided by a user.

The analysis signal suitably comprises an amplitude comparison signal which indicates whether or not the detected signal amplitude meets or exceeds the threshold amplitude. Where the signal amplitude meets or exceeds the threshold amplitude, for example based on an indication of the amplitude comparison signal, the controller is suitably configured to further analyse the received ultrasound signals. In this case, the controller can be configured to store the received ultrasound signals in the data store 522. The data store may be located at the controller, as illustrated in FIG. 5. The data stored may be located remote from the controller, for example in the cloud. The data store is suitably accessible to the controller.

The signal analyser comprises a position detector 524 configured to detect a first transducer position of the first transducer module. The position detector may also be configured to detect a second transducer position of the second transducer module. The signal analyser is configured to output the analysis signal in dependence on the first transducer position and the second transducer position. Referring to FIG. 5, the position detector 524 is shown as part of the signal analyser 516. In other implementations, the position detector 524 may be provided separately from the signal analyser 516, for example as part of the controller 510, or as part of the scanning system 500 separate from the controller.

The first transducer position suitably indicates the position of the first transducer relative to the object. The first transducer position may be in the frame of reference of the object. The first transducer position may be in the frame of reference of a table on which the object is located, or of a room in which the object is located. The second transducer position suitably indicates the position of the second transducer relative to the object. The second transducer position may be in the frame of reference of the object. The second transducer position may be in the frame of reference of a table on which the object is located, or of a room in which the object is located. The first transducer position may indicate the position of the first transducer relative to the second transducer. In this case the frame of reference in which the position is determined may be relative to one of the first transducer module, the second transducer module or the controller. The frame of reference with which the first transducer position and the second transducer position is determined is not critical. What is important is being able to determine the relative positions of the first transducer module and the second transducer module. In this way the alignment between the first transducer module and the second transducer module can be checked.

The analysis signal suitably comprises a position comparison signal which indicates an alignment between the first transducer module and the second transducer module. The alignment can comprise a first component relating to the angular alignment and a second component relating to the lateral alignment.

The first component of the alignment comprises the angular alignment between the two transducer modules. For example, the first component of the alignment can comprise a measure of the angle between the first 2D array of the first transducer and the second 2D array of the second transducer. The second component of the alignment comprises the lateral alignment between the two transducer modules. For example, the second component of the alignment can comprise a measure of lateral separation between the first transducer module and the second transducer module. That is, the second component of the alignment can comprise a vector indicating the magnitude and direction of the lateral separation between the two transducer modules. Where the first transducer module and the second transducer module are both arranged so as to abut flat against a metal plate with opposing parallel faces, the first component is likely to be zero. That is, the first transducer module and the second transducer module will be in angular alignment, since the ultrasound signals transmitted by the first transducer module can be directly received at the second transducer module (where no lateral separation exists). As the transducer modules move relative to one another across the face of the object, the angular alignment, i.e. the first component of the alignment, will remain the same but the second component of the alignment will vary.

The first positioning system 534 provided at the first transducer module is suitably a local positioning system. The second positioning system 544 provided at the second transducer module is suitably a local positioning system. The local positioning system (i.e. one or both of the first positioning system and the second positioning system is configured to generate location data at the scanning system. The location data generated by the local positioning system may be absolute location data, e.g. data indicating the location of the respective transducer module relative to the frame of reference, and/or relative location data, e.g. data relative to a known location. Relative location data can, in some examples, comprise an indication of a distance through which the respective transducer module has been moved from a known location, and/or an angle through which the respective transducer module has been rotated from a known orientation. The relative location data is useful when used in combination with absolute location data (for example a known starting location and/or a known starting orientation) to determine how the respective transducer module is moved. The relative location data can, in some examples, be used to increase the accuracy of the location determination compared to using only the absolute location data.

In the discussion herein a local positioning system or a positioning system may be discussed, but it will be appreciated that the features of this local positioning system or of this positioning system may be provided at one or both of the first positioning system 534 and the second positioning system 544.

The local positioning system suitably comprises a rotational encoder. The local positioning system can comprise a plurality of rotational encoders.

The positioning system can comprise a single rotational encoder which is configured to encode rotation about an axis of the respective transducer module which is aligned with (or substantially aligned with) a longitudinal axis of the respective transducer module. The axis may be normal (or substantially normal) to a local surface area of the object.

The positioning system can comprise two rotational encoders (which may be provided instead of or in addition to the single rotation encoder described above), each configured to encode rotation about respective axes which are transverse (for example perpendicular) (or substantially transverse) to the longitudinal axis of the respective transducer module. The respective axes may be aligned (or substantially aligned) in the plane of a local surface area of the object. The respective axes of the two rotational encoders are suitably oriented at 90 degrees to one another. This arrangement enables the positioning system comprising the two rotational encoders to detect lateral movement of the scanning apparatus.

The rotational encoder may include a ball for moving over a surface of the object, and one or more encoder coupled to the ball to detect rotation of the ball in at least one direction. The rotational encoder may comprise two encoder wheels (or cylinders) configured to rotate about respective axes that are angularly offset, for example perpendicular, from one another. The encoder wheels are suitably in contact with the ball and configured to rotate in dependence on rotation of the ball.

Suitably the rotational encoder is configured to detect movement in perpendicular directions, e.g. directions in the plane of the front or back surface of the object. In some examples a single encoder wheel may be provided to detect movement in a single direction. In some examples where two encoder wheels are provided, the encoder wheels need not rotate about respective axes that are perpendicular to one another.

The ball is, in at least some examples, disposed towards a side of the respective transducer module configured to face towards the object. The ball preferably protrudes from the side of the respective transducer module configured to face towards the object. In some examples the ball is mounted to a resilient mechanism which is movable relative to the respective transducer module such that the ball is movable into and out of the respective transducer module. This arrangement permits the ball to contact the surface of the object, so as to detect movement of the respective transducer module along that object, whilst at the same time enabling the ultrasound-transmitting surface of the respective transducer module to be applied to the object with the desired force. In some examples, the provision of the ball does not affect the force with which the respective transducer module can be applied to the surface of the object.

Each encoder wheel is configured to output a signal that is indicative of a distance that the scanning apparatus is moved along the surface of the object in a direction detected by that encoder wheel. In an example where one encoder wheel is configured to detect distance along an x direction, and another encoder wheel is configured to detect distance along a y direction, the local positioning system can output one signal indicative of the distance moved in the x direction and another signal indicative of the distance moved in the y direction. Note that the x and y directions as referenced herein need not be oriented in any particular direction relative to a frame of reference such as the object, or an environment of the object. Rather, the x and y direction denote that, in these examples, the directions are perpendicular to one another. Suitably, however, the x and y directions will be in the plane of a surface of the object.

The local positioning system can be configured to transmit electromagnetic radiation and to detect reflections of the transmitted electromagnetic radiation thereby to determine a change in position. The local positioning system may comprise an LED and a detector.

The local positioning system may comprise an optical positioning system. The optical positioning system may be configured to determine a change in position in dependence on the detection of light reflected from a surface of an object as the respective transducer module is moved across the surface. The optical positioning system may detect specularly reflected light from a surface of an object.

The LED may be an optical LED and the detector may be configured to detect optical wavelengths of light. The LED may be an infrared LED and the detector may be configured to detect infrared wavelengths of light.

The local positioning system can comprise a laser and a detector for detecting reflected laser light.

The local positioning system may additionally or alternatively comprise an inertial measurement unit. The inertial measurement unit can comprise a gyroscope and/or an accelerometer. The inertial measurement unit may comprise a one-axis accelerometer. The inertial measurement unit may comprise a two-axis accelerometer. The inertial measurement unit may comprise a three-axis accelerometer.

Suitably the local positioning system couples to a general purpose I/O interface of the respective transducer module. The local positioning system is provided at the transducer module, for example adjacent the transducer. The transducer is located at a surface of the transducer module for facing an object under test. The local positioning system is provided at the same surface of the transducer module, adjacent the transducer. The local positioning system is located within a housing of the transducer module. Locating the local positioning system in this way can help protect the local positioning system.

As discussed elsewhere herein, the local positioning system may comprise a rotational encoder and/or an optical positioning system. Providing the local positioning system at the surface of the transducer module for facing the object under test enables the local positioning system to determine a local position, or a relative local position, as the transducer module is moved across a surface of the object under test.

In an alternative configuration, a transducer module may again comprise a transducer and a local positioning system. In this example, however, the local positioning system is coupled to the outside of a housing of the transducer module. This approach can simplify the manufacture of the transducer module. The transducer can be provided across the whole of an interior of the housing of the transducer module. This can simplify the retention of the transducer within the housing. This approach also facilitates a retro-fitting of the local positioning system to existing transducer modules. There is no need to redesign the transducer module so as to provide the local positioning system within the housing. Rather, the local positioning system may usefully be provided exterior to the housing, as part of the transducer module. Suitably, the local positioning system is provided so as to engage with the surface of the object under test, e.g. as described herein.

The local positioning system can be provided such that the surface of the local positioning system for facing the object is along the same plane as the surface of the transducer for facing the object. Suitably the surface of the local positioning system and the surface of the transducer are continuous with one another, or substantially continuous.

Locating the local positioning system adjacent the transducer can increase the accuracy of the local positioning determination in relation to the part of the object under test. For example, where the object is not a flat object, it can be useful to position the local positioning system adjacent, or relatively near to, the transducer so that the local positioning system can engage with the surface of the object as the surface of the object is scanned by the transducer.

Figure 6:
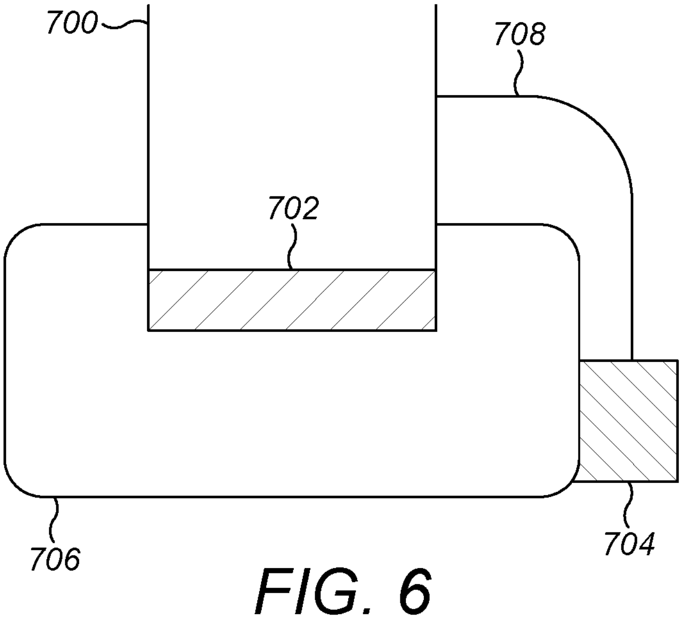
FIG. 6 shows an example of a transducer module and coupling.
Figure 7:
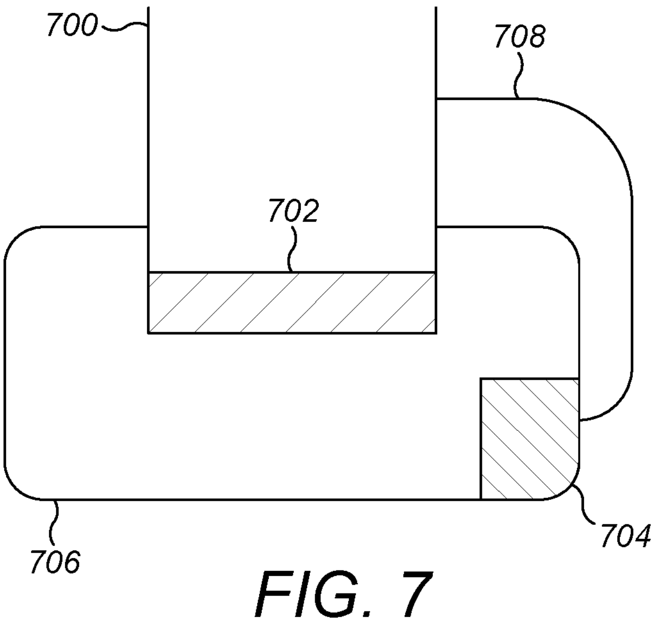
FIG. 7 shows another example of a transducer module and coupling.

An alternative arrangement will now be described with reference to FIGS. 6 and 7. In some use cases, the transducer module can be placed directly against the object under test. In such cases, the arrangements described above can be used. In other use cases, it may be desirable to provide a coupling, such as a dry coupling, between the transducer and the surface of the object under test. This can be done to improve the transmission of ultrasound into the object and/or to introduce a desired delay in the timing of receiving the reflection at the transducer. The coupling can be provided by way of a coupling shoe, as illustrated in FIGS. 6 and 7. FIG. 6 shows a transducer module 700 comprising a transducer 702. A local positioning system 704 is provided on or as part of a coupling 706 such as a coupling shoe. The local positioning system can be connected to the transducer module, for example to a general purpose I/O interface of the transducer module by a wired connection 708 and/or wirelessly. Where the local positioning system 704 comprises a wireless connection module, the local positioning system may additionally or alternatively connect directly to a remote system.

The local positioning system may be provided exterior to the coupling (for example mounted to an exterior surface of the coupling) as illustrated in FIG. 6, or interior to the coupling (for example as part of the coupling or in a recess in the coupling) as illustrated in FIG. 7.

Suitably the local positioning system 704 is provided such that a surface of the local positioning system for facing the object under test is along the same plane as the surface of the coupling for facing the object. Suitably the surface of the local positioning system and the surface of the coupling are continuous with one another, or substantially continuous.

It will be understood that arrangements may be provided in which a transducer module having a first local positioning system either within or external to the housing can be provided with a coupling that comprises a second local positioning system. In this case, the first local positioning system can be used where the transducer module is used without a coupling, and the second local positioning system can be used where the transducer module is used with the coupling. This approach provides flexibility in the use of the transducer module and of the local positioning systems.

The examples of the local positioning system described above with reference to FIGS. 6 and 7 are configured to interface with a surface of an object under test so as to determine a local position or relative local movement.

The local positioning system can be configured to determine a local position or relative local movement without needing to interface with a surface of an object under test. For example, the local positioning system can comprise a gyroscope. The local positioning system can comprise an accelerometer.

In some implementations, the local positioning system can comprise an arrangement configured to determine the local position or relative local movement by interfacing with a surface of an object under test and another arrangement configured to determine the local position or relative local movement without needing to interface with a surface of an object under test. In other implementations, only one of these arrangements need be provided.

Where the local positioning system comprises an arrangement that need not interface with the object directly, such as a gyroscope, the local positioning system need not be located at the scanning surface of the transducer module. In such cases, the local positioning system can be provided at the top of the transducer module, i.e. away from the scanning surface. This location is convenient since, in some implementations of the transducer module, the general purpose I/O port, to which the local positioning system is suitably coupled, can be located at the top of the transducer module. This position of the local positioning system also enables a more compact scanning surface to be provided. Where the local positioning system is spaced from the transducer, the relative positioning of the local positioning system and the transducer can be determined, suitably during manufacture, such that the location of the transducer can be determined by the local positioning system.

The inertial measurement unit is able to detect changes in the orientation of the respective transducer module, for example a tilt about a longitudinal axis of the respective transducer module (or about an axis normal to a local surface area of the object). These changes in the orientation of the respective transducer module can be used to identify where the respective transducer module tilts, for example as the surface of the object curves.

Figure 8:
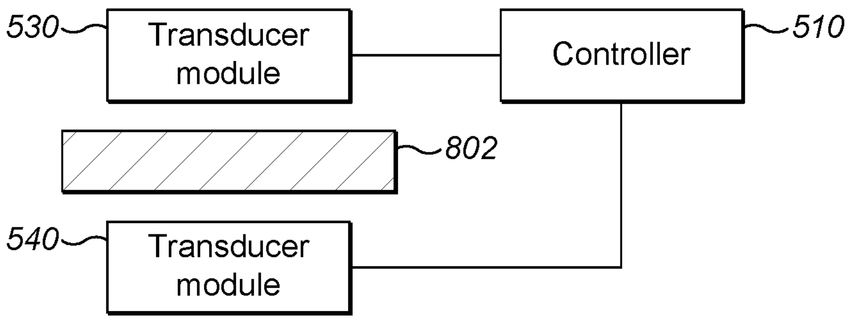
FIG. 8 shows an arrangement of the scanning system of FIG. 5 in a through-transmission mode.

FIG. 8 illustrates an arrangement of the scanning system when scanning an object in a through-transmission mode. The first transducer module 530 and the second transducer module 540 are disposed to either side of the object to be scanned 802. The controller 510 is coupled to both the first transducer module and the second transducer module.

The signal analyser 516 comprises an overlap detector 520 configured to detect an overlap in the lateral extent of the first transducer module and the second transducer module, based on an analysis of the received ultrasound signals.

Figure 9:
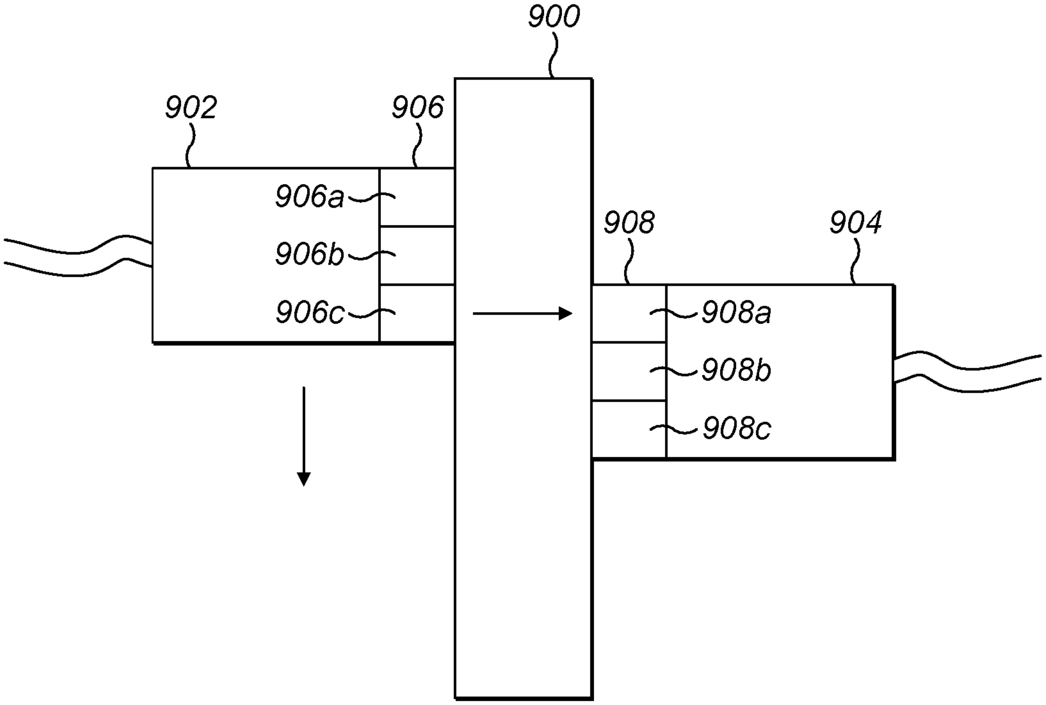
FIG. 9 shows an overlapping arrangement of two transducer modules.
Figure 10:
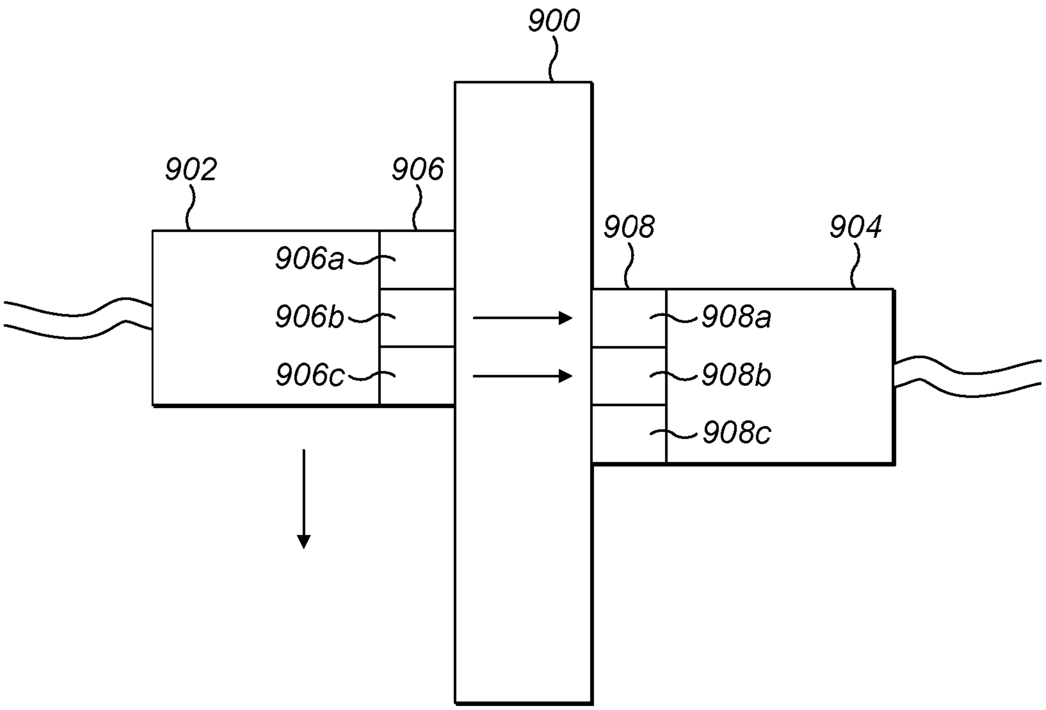
FIG. 10 shows another overlapping arrangement of two transducer modules.
Figure 11:
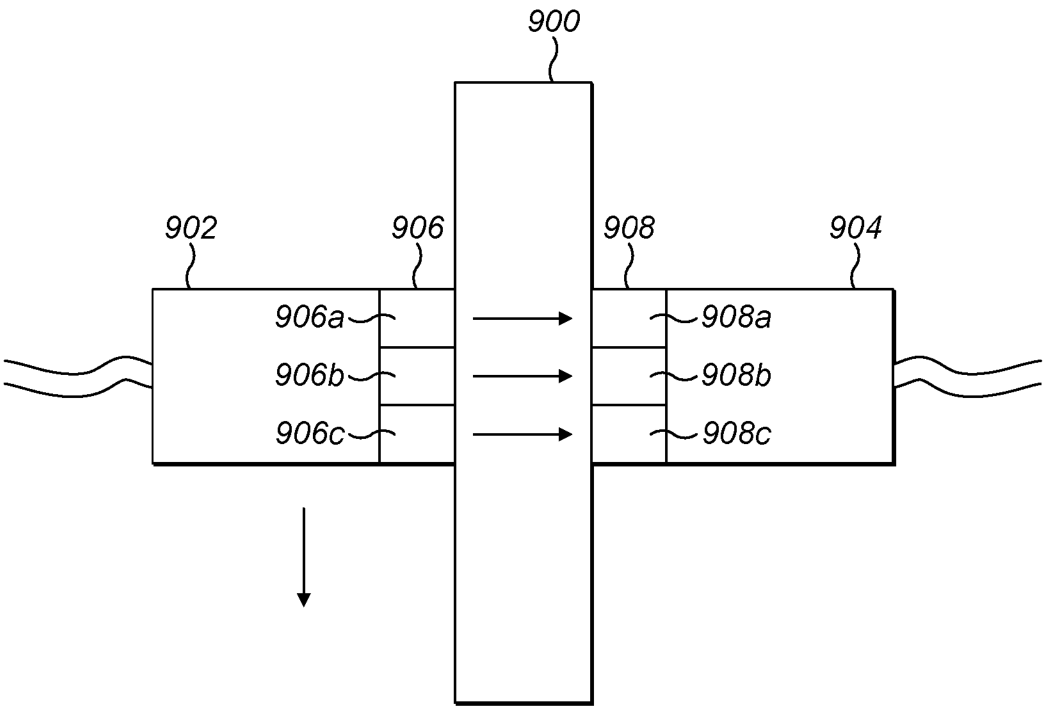
FIG. 11 shows another overlapping arrangement of two transducer modules.

The concept of overlap between the first transducer module and the second transducer module is described with reference to FIGS. 9 to 11. In FIGS. 9 to 11, an object to be scanned is illustrated at 900. A first transducer module 902 is disposed to one side of the object 900. A second transducer module 904 is disposed towards an opposite side of the object 900.

The first transducer module 902 comprises a first transducer 906. The second transducer module 904 comprises a second transducer 908. In the figures, the first and second transducers 906, 908 are schematically divided into three for the purposes of describing the overlap. In practice, each transducer will comprise a 2D transducer array comprising many more transducer elements. For example, the array might comprise 32×32 transducer elements, 64×64 transducer elements, 128×128 transducer elements, and so on.

In FIG. 9, the first transducer module 902 is higher (as illustrated) than the second transducer module 904. In the configuration illustrated in FIG. 9, the lowermost section of the first transducer 906 (transducer section 906*c*) is in horizontal alignment with the uppermost section of the second transducer 908 (transducer section 908*a*). Thus, ultrasound signals transmitted by transducer section 906*c* (illustrated schematically by arrow 909) are transmitted directly towards transducer section 908*a*. There is therefore an overlap between the first transducer module 902 and the second transducer module 904. Specifically the lowermost section of the first transducer 906 (transducer section 906*c*) overlaps with the uppermost section of the second transducer 908 (transducer section 908*a*).

A downward arrow under the first transducer 902 in FIG. 9 indicates that the first transducer is moving in a downward direction. The second transducer 904 is static. In FIG. 10, the first transducer module 902 is lower compared to its position in FIG. 9, but remains higher than the second transducer module 904. In the configuration illustrated in FIG. 10, the lowermost two sections of the first transducer 906 (transducer sections 906*b* and 906*c*) are in horizontal alignment with the uppermost two sections of the second transducer 908 (transducer sections 908*a* and 908*b*). Thus, ultrasound signals transmitted by transducer sections 906*b* and 906*c* (illustrated schematically by arrows 910) are transmitted directly towards transducer sections 908*a* and 908*b*. There is therefore an overlap between the first transducer module 902 and the second transducer module 904. Specifically the lowermost two sections of the first transducer 906 (transducer sections 906*b* and 906*c*) overlap with the uppermost two sections of the second transducer 908 (transducer sections 908*a* and 908*b*).

FIG. 11 illustrates a configuration in which the first transducer module 902 has moved downwardly compared to its position in FIG. 10. The second transducer 904 remains in the same position it occupied in FIG. 10. In FIG. 11, the first transducer module 902 is lower compared to its position in FIG. 10, and is now fully aligned with the second transducer module 904. In the configuration illustrated in FIG. 11, all three of the sections of the first transducer 906 (transducer sections 906*a* to 906*c*) are in horizontal alignment with all three of the sections of the second transducer 908 (transducer sections 908*a* to 908*c*). Thus, ultrasound signals transmitted by each of the transducer sections 906*a* to 906*c* (illustrated schematically by arrows 911) are transmitted directly towards transducer sections 908*a* to 908*c*. There is therefore an overlap between the first transducer module 902 and the second transducer module 904. Specifically, all of the sections of the first transducer 906 (transducer sections 906*a* to 906*c*) overlap with all of the sections of the second transducer 908 (transducer sections 908*a* to 908*c*).

Thus the (lateral) overlap between the first transducer module and the second transducer module in FIG. 9 is one third. The overlap between the first transducer module and the second transducer module in FIG. 10 is two thirds. In FIG. 11, the first transducer module and the second transducer module fully overlap.

Suitably the overlap detector 520 is configured to output an overlap signal based on a determined amount of overlap between the first transducer module and the second transducer module. The overlap signal can be generated by the overlap detector in dependence on the determined amount of overlap meeting or exceeding a threshold overlap. Suitably the threshold overlap is at least 25% of the area of the respective transducers. The threshold overlap may be at least 50% of the area of the respective transducers. The threshold overlap may be at least 75% of the area of the respective transducers. The threshold overlap may be at least 85% of the area of the respective transducers. The greater the threshold overlap, the better the alignment between the first transducer module and the second transducer module will need to be before the overlap detector will output the overlap signal indicating that the threshold has been met or exceeded. Thus the threshold overlap can be used as a measure of alignment between the two transducer modules.

Figure 12:
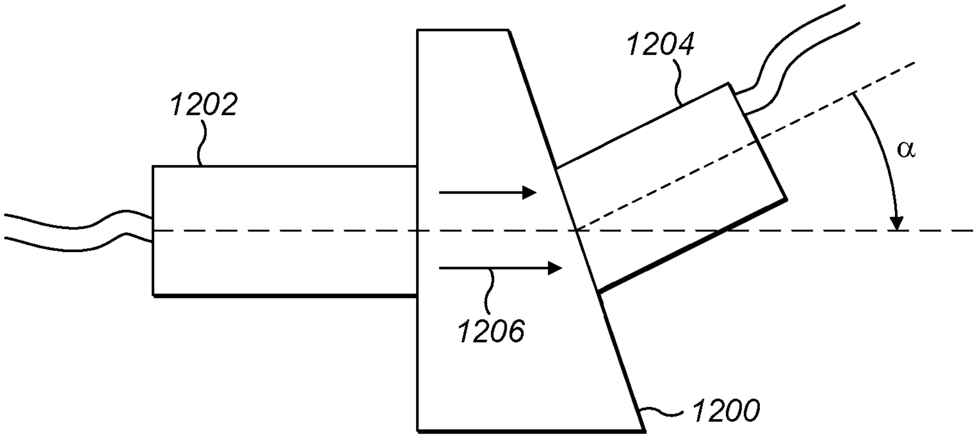
FIG. 12 shows an arrangement of transducer modules inclined relative to one another.

The overlap between the transducer modules may take account of the relative orientation between the transducer modules. With reference to FIG. 12, it can be seen that the first transducer module 1202 is oriented in the horizontal plane whereas the second transducer module 1204 is oriented at an angle α to the horizontal plane. As illustrated in FIG. 12, this difference in orientation between the transducer modules is due to the front and back surfaces of the object being scanned 1200 not being parallel to one another. Other situations will readily occur which would cause the orientation of the transducer modules to differ.

The transmission of ultrasound between the first transducer module and the second transducer module is indicated schematically by arrows 1206 in FIG. 12. In the illustrated configuration, the transducer in the second transducer module is generally horizontally aligned with the transducer in the first transducer module. However, since the transducers are inclined relative to one another, the amplitude of the detected signals will differ compared to the situation where the transducers are not inclined relative to one another. Knowledge of the relative orientation between the transducer modules therefore enables this to be taken into account when analysing the amplitude and/or intensity of the received ultrasound signals. Thus the subsequent analysis of the received ultrasound signals can be made more accurate.

The signal analyser is suitably configured to further analyse (or store for later analysis, for example at the data store or a remote data store) the received ultrasound signals based on one or more of:

- an amplitude of a peak in the received ultrasound signals meeting or exceeding the threshold amplitude; and
- an overlap between the first transducer module and the second transducer module meeting or exceeding the threshold overlap.

Suitably the scanning system is configured to automatically process the received ultrasound signals for further analysis, for example by storing or transferring the received ultrasound signals, based on whether the amplitude of the peak meets or exceeds the threshold amplitude and/or based on whether the overlap meets or exceeds the threshold overlap.

Automatically processing the received ultrasound signals based on one or both of these comparisons means that the alignment (and adjustment of the alignment) between the two transducer modules need not be performed in a separate alignment phase but instead can be performed in real-time during a scan. When the alignment between the transducer modules is sufficient to meet or exceed the relevant thresholds the received ultrasound signals can be processed for further analysis without requiring a separate scan to be initiated during which the ultrasound signals to be processed could be received. Thus this approach can lead to a more efficient scanning system.

Following this approach it is not necessary for careful alignment to be established between the two transducer modules. Instead one transducer module can be held in place whilst the other transducer module is moved across the opposite surface of the object to be scanned. As the moving transducer module passes through a position in which it is aligned sufficiently to exceed the relevant thresholds discussed herein, the ultrasound signals can be captured and passed on for subsequent processing within the scanning system.

Where a more careful alignment may be desirable, feedback from one or more of the threshold detector, the overlap detector and the position detector may be provided to a user. The feedback may be in the form of a number, for example a percentage, representing a measure of alignment between the two transducer modules. The user is able to move the transducer modules relative to one another so as to maximise this measure of alignment. Once the measure of alignment has been maximised, or increased to a value satisfying user requirements, the ultrasound scan can be initiated.

The positioning systems 534, 544, and/or the position detector 524, enable a measure of the position of the transducer modules to be determined. Thus the location on the object at which an ultrasound scan is performed can be monitored and recorded. This enables use of averaging algorithms where subsequent ultrasound scans are performed at the same location on the object. In these cases, the data from multiple scans can be averaged together which can lead to an improvement in the signal to noise ratio.

It is also possible for the data to have associated therewith a measure of the alignment between the two transducer modules. For example, a first scan at a first position can have an associated measure of alignment of, for example, 75%. A second scan at the same first position can have an associated measure of alignment of, for example, 85%. Data from the first scan and the second scan can be combined together. In one example, the data combination can be a simple average. In another example, the data combination can be a weighted average. The weights applied to each data set are suitably dependent on the measure of alignment between the two transducer modules when the respective data set was captured. Thus, in the above example, the data in the second scan will have a greater weighting than the data in the first scan due to the second scan being associated with a relatively higher measure of alignment. This approach can lead to higher accuracy data being more strongly weighted in the resulting data set, which can improve the accuracy of the scan results and subsequent analysis of those scan results.

Alternatively, where data is obtained at a given measure of alignment and that data is stored, the stored data can be replaced by data captured during a subsequent scan if that subsequent scan is associated with a measure of alignment higher than the given measure of alignment. Thus, again taking the example above, where the first scan has an associated measure of alignment of 75% and the second scan has an associated measure of alignment of 85%, data from the second scan can replace saved data from the first scan. This approach can lead to the captured data with the highest accuracy forming the resulting data set, which can improve the accuracy of the scan results and subsequent analysis of those scan results.

A combination of these approaches is possible. For example, data scans can be combined by averaging or weighted averaging where the measure of alignment is at or above a threshold measure of alignment. Captured data associated with a measure of alignment below the threshold measure of alignment need not be combined with earlier data sets. However if captured data associated with a measure of alignment below the threshold measure of alignment is the first data set captured in respect of a position on the object, that data may still be stored. Where no subsequent data relating to that position is captured, then that data will form part of the resulting overall data set. However where subsequent data, associated with a measure of alignment meeting or exceeding the threshold measure of alignment, is captured that relates to that position, then that subsequent data can replace the initially captured data.

As mentioned, the scanning system 500 optionally comprises an image generator 550, a display 560 coupled to the image generator 550, and a user input device 570. The image generator 550 is configured to generate an image scan representative of structural features below a surface of an object in dependence on the received ultrasound signals. The display 560 is configured to display the image scan. The user input device 570 is configured to generate an indication signal whereby a user can indicate a portion of the displayed image scan. The analysis module signal analyser 516 may be configured to identify the feature in response to the generated indication signal.

The scanning system 500 need not comprise one or more of the image generator 550, the display 560, and the user input device 570. The scanning system 500 may alternatively or additionally comprise a communications port 580 for outputting a signal to cause a display remote from the scanning system 500 to display the generated image scan. The communications port 580 may output data representative of the received ultrasound signals to enable a remote image generator to generate the image scan. The remotely-generated image scan can be displayed on a remote display and/or passed back, for example via the communications port 580 for display on the display 560. This flexibility in configuration enables the scanning system 500 to couple to external systems where suitable, for example to use external processing capabilities, as appropriate.

The techniques described herein can provide a more flexible scanning system, with enhanced accuracy and/or usability.

Figure 13:
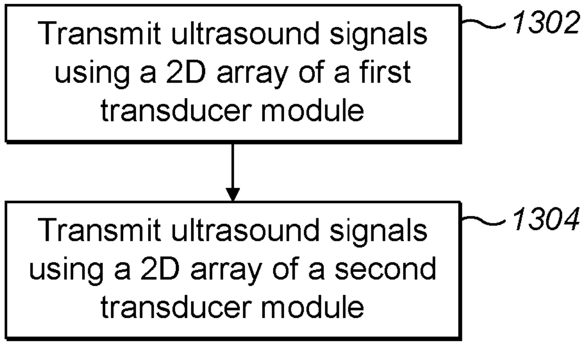
FIG. 13 is a flowchart of an illustrative method.

A method will now be described with reference to FIG. 13. Ultrasound signals are transmitted using a 2D array of a first transducer module 1302. The ultrasound signals are transmitted in response to a trigger signal generated at a controller. Ultrasound signals are received using a 2D array of a second transducer module 1304. The ultrasound signals are suitably received in response to the trigger signal.

Figure 14:
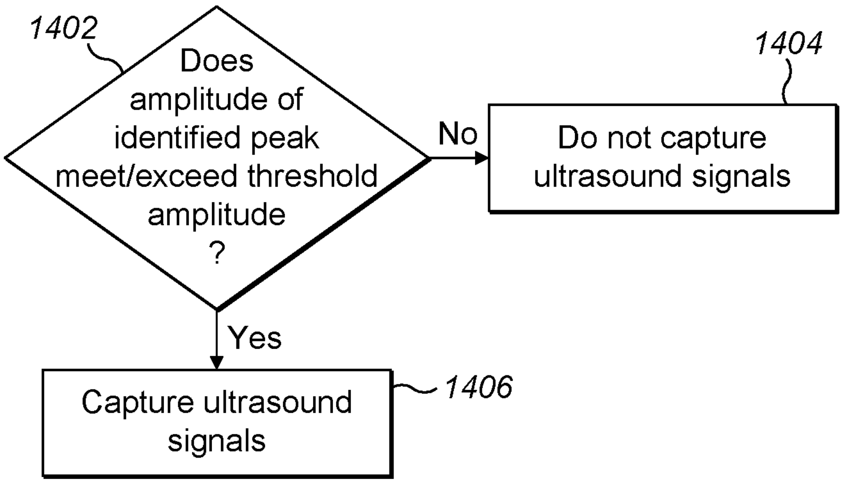
FIG. 14 is a flowchart of an illustrative method of analysing an amplitude.

With reference to FIG. 14, a method can comprise determining whether an amplitude of an identified peak meets or exceeds a threshold amplitude 1402. If the amplitude of the identified peak is below the threshold amplitude, then ultrasound signals are not captured 1404. If the amplitude of the identified peak is at or above the threshold amplitude, then ultrasound signals are captured 1406.

Figure 15:
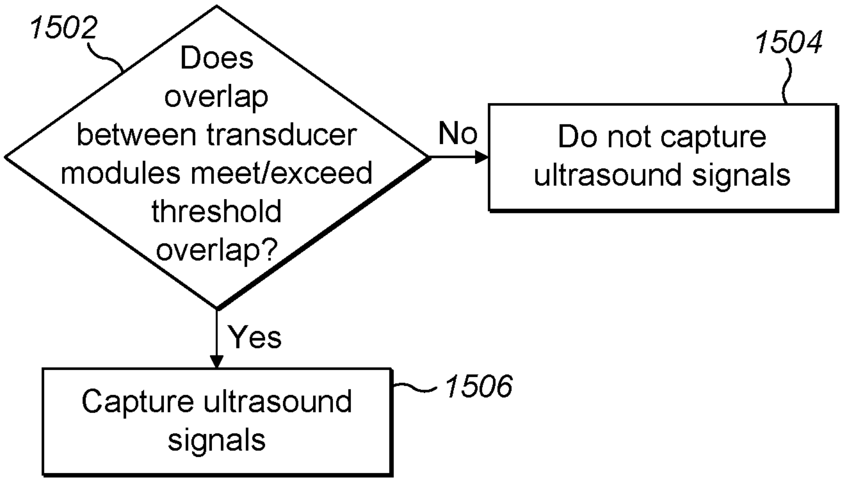
FIG. 15 is a flowchart of an illustrative method of analysing an overlap.

With reference to FIG. 15, a method can comprise determining whether an overlap between a first transducer module and a second transducer module in a through-transmission mode meets or exceeds a threshold overlap 1502. If the overlap is below the threshold overlap, then ultrasound signals are not captured 1504. If the overlap is at or above the threshold overlap, then ultrasound signals are captured 1506.

Figure 16:
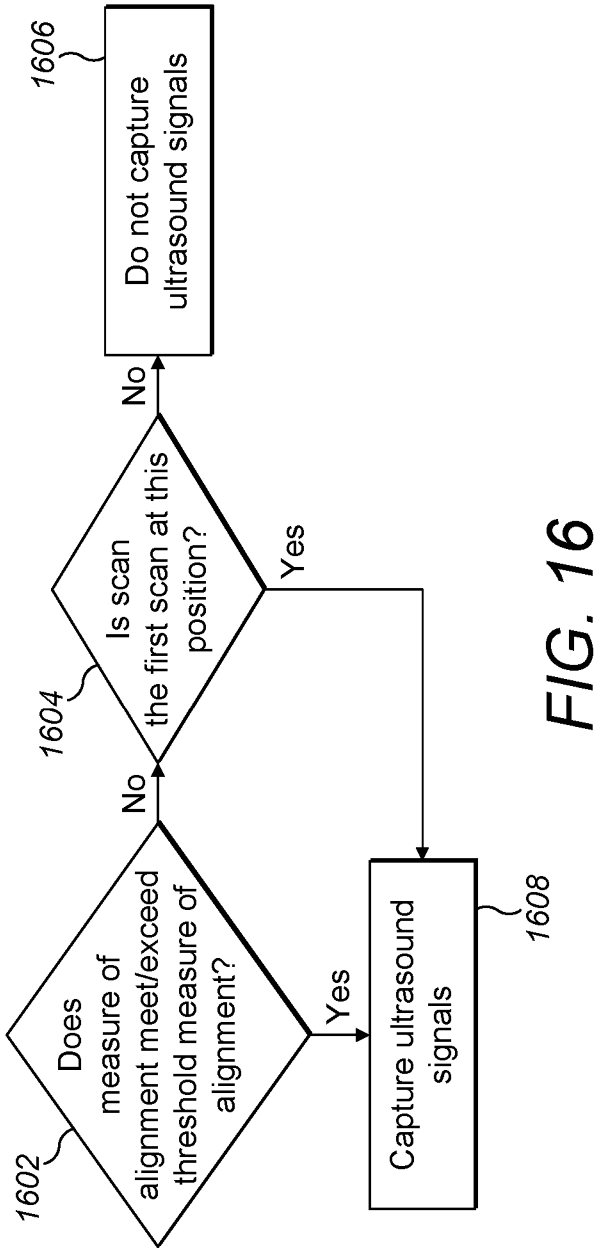
FIG. 16 is a flowchart of an illustrative method of analysing a measure of alignment.

With reference to FIG. 16, a method can comprise determining whether a measure of alignment meets or exceeds a threshold measure of alignment 1602. If the measure of alignment is below the threshold measure of alignment, then it can be determined, at 1604, whether the scan is the first scan at a given position. If the scan is not the first scan at that given position, then ultrasound signals are not captured 1606. If the scan is the first scan at that given position, then ultrasound signals are captured 1608. If the measure of alignment is at or above the threshold measure of alignment, then ultrasound signals are captured 1608.

The apparatus and methods described herein are particularly suitable for detecting debonding and delamination in composite materials such as carbon-fibre-reinforced polymer (CFRP). This is important for aircraft maintenance. It can also be used to detect flaking around rivet holes, which can act as a stress concentrator. The apparatus is particularly useful for detecting corrosion, welding, cracks, and so on, in metals or metallic structures. The apparatus is particularly suitable for applications where it is desired to image a small area of a much larger component. The apparatus is lightweight, portable and easy to use. It can readily be carried by hand by an operator to be placed where required on the object.

The structures shown in the figures herein are intended to correspond to a number of functional blocks in an apparatus. This is for illustrative purposes only. The functional blocks illustrated in the figures represent the different functions that the apparatus is configured to perform; they are not intended to define a strict division between physical components in the apparatus. The performance of some functions may be split across a number of different physical components. One particular component may perform a number of different functions. The figures are not intended to define a strict division between different parts of hardware on a chip or between different programs, procedures or functions in software. The functions may be performed in hardware or software or a combination of the two. Any such software is preferably stored on a non-transient computer readable medium, such as a memory (RAM, cache, FLASH, ROM, hard disk etc.) or other storage means (USB stick, FLASH, ROM, CD, disk etc). The apparatus may comprise only one physical device or it may comprise a number of separate devices. For example, some of the signal processing and image generation may be performed in a portable, hand-held device and some may be performed in a separate device such as a PC, PDA or tablet. In some examples, the entirety of the image generation may be performed in a separate device. Any of the functional units described herein might be implemented as part of the cloud.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

The following numbered clauses form part of the description.

1. A scanning system for imaging structural features below the surface of an object, the scanning system comprising:
   a controller for interfacing with a plurality of transducer modules;
   a first transducer module coupled to the controller and comprising a first 2D array configured to transmit ultrasound signals towards an object under control of the controller; and
   a second transducer module coupled to the controller and comprising a second 2D array configured to receive ultrasound signals transmitted by the first transducer module that pass through the object whereby data pertaining to an internal structure of the object can be obtained.
2. A scanning system as in 1, in which the first 2D array is configured to receive ultrasound signals from the object whereby data pertaining to an internal structure of the object can be obtained.
3. A scanning system as in 1 or 2, in which the second 2D array is configured to transmit further ultrasound signals towards the object under control of the controller.
4. A scanning system as in any preceding clause, in which the controller comprises a trigger signal generator for generating a trigger signal, and the first transducer module is configured to transmit the ultrasound signals in response to receiving the trigger signal.
5. A scanning system as in 4, in which the second transducer module is configured, in response to receiving the trigger signal, to receive the ultrasound signals transmitted by the first transducer module.
6. A scanning system as in any preceding clause, in which the controller comprises a signal analyser configured to analyse the received ultrasound signals and to output an analysis signal, the controller being configured to further analyse the received ultrasound signals based on the analysis signal.
7. A scanning system as in 6, in which the signal analyser comprises a threshold detector configured to detect the signal amplitude of the received ultrasound signals and to compare the signal amplitude with a threshold amplitude, and to output the analysis signal in dependence on the comparison.
8. A scanning system as in 6 or 7, in which the signal analyser is configured to identify a feature in the received ultrasound signals and to output the analysis signal in dependence on the identified feature.
9. A scanning system as in 8, in which the threshold detector is configured to detect the amplitude of the identified feature.
10. A scanning system as in any of clauses 6 to 9, in which the signal analyser comprises a position detector configured to detect a first transducer position of the first transducer module and a second transducer position of the second transducer module, and to output the analysis signal in dependence on the first transducer position and the second transducer position.
11. A scanning system as in any of clauses 6 to 10, in which the signal analyser comprises an overlap detector configured to detect an overlap in the lateral extent of the first transducer module and the second transducer module, based on an analysis of the received ultrasound signals and/or the first transducer position and the second transducer position.
12. A scanning apparatus as in any of clauses 6 to 11, in which the controller is configured to further analyse received ultrasound signals based on one or more of:
   detecting that an amplitude of a peak in the received ultrasound signals meets or exceeds a threshold amplitude;
   detecting that an overlap between the first transducer module and the second transducer module meets or exceeds a threshold overlap; and
   detecting that a measure of alignment between the first transducer module and the second transducer module meets or exceeds a threshold measure of alignment.
13. A method of imaging structural features below the surface of an object, the method comprising:
   transmitting ultrasound signals, using a first 2D array of a first transducer module, towards an object, under control of a controller;
   receiving ultrasound signals transmitted by the first transducer module that pass through the object, using a second 2D array of a second transducer module; and
   analysing the received ultrasound signals to obtain data pertaining to an internal structure of the object.
14. A method as in clause 13, comprising receiving, by the first 2D array, ultrasound signals from the object under whereby data pertaining to an internal structure of the object can be determined.
15. A method as in clause 13 or 14, comprising transmitting, by the second 2D array, further ultrasound signals towards the object under control of the controller.
16. A method as in any of clauses 13 to 15, comprising generating a trigger signal at a trigger signal generator of the controller, and transmitting, by the first transducer module, the ultrasound signals in response to receiving the trigger signal.
17. A method as in clause 16, comprising, in response to receiving the trigger signal, receiving the ultrasound signals transmitted by the first transducer module at the second transducer module.
18. A method as in any of clauses 14 to 17, comprising analysing the received ultrasound signals at a signal analyser of the controller, and outputting an analysis signal by the signal analyser, wherein the controller further analyses the received ultrasound signals based on the analysis signal.
19. A method as in clause 18, comprising detecting a signal amplitude of the received ultrasound signals by a threshold detector of the signal analyser, comparing the signal amplitude with a threshold amplitude, and outputting the analysis signal in dependence on the comparison.
20. A method as in clause 18 or clause 19, comprising identifying, by the signal analyser, a feature in the received ultrasound signals, and outputting the analysis signal in dependence on the identified feature.
21. A method as in clause 20, comprising detecting the amplitude of the identified feature by the threshold detector.
22. A method as in any of clauses 18 to 21, comprising detecting, at a position detector of the signal analyser, a first transducer position of the first transducer module and a second transducer position of the second transducer module, and outputting the analysis signal in dependence on the first transducer position and the second transducer position.

23. A method as in any of clauses 18 to 22, comprising detecting, at an overlap detector of the signal analyser, an overlap in the lateral extent of the first transducer module and the second transducer module, based on an analysis of the received ultrasound signals and/or the first transducer position and the second transducer position.

24. A method as in any of clauses 18 to 23, comprising analysing the received ultrasound signals based on one or more of:
- detecting that an amplitude of a peak in the received ultrasound signals meets or exceeds a threshold amplitude;
- detecting that an overlap between the first transducer module and the second transducer module meets or exceeds a threshold overlap; and
- detecting that a measure of alignment between the first transducer module and the second transducer module meets or exceeds a threshold measure of alignment.

The invention claimed is:

1. A scanning system configured for through-transmission ultrasound imaging of structural features below a surface of an object, the scanning system comprising:
- a controller for interfacing with a plurality of transducer modules, the controller comprising a trigger signal generator for generating a trigger signal;
- a first transducer module coupled to the controller and comprising a first 2D array configured to transmit ultrasound signals towards an object under control of the controller and to receive ultrasound signals from the object whereby data pertaining to an internal structure of the object can be obtained; and
- a second transducer module coupled to the controller and comprising a second 2D array configured to receive through-transmission ultrasound signals transmitted by the first transducer module that pass through the object whereby data pertaining to an internal structure of the object can be obtained,
- wherein the first transducer module is configured to transmit the ultrasound signals in response to receiving the trigger signal, and the second transducer module is configured, in response to receiving the trigger signal, to receive the ultrasound signals transmitted by the first transducer module.

2. The scanning system as claimed in claim 1, in which the second 2D array is configured to transmit further ultrasound signals towards the object under control of the controller.

3. The scanning system as claimed in claim 1, in which the controller comprises a signal analyser configured to analyse the received ultrasound signals and to output an analysis signal, the controller being configured to further analyse the received ultrasound signals based on the analysis signal.

4. The scanning system as claimed in claim 3, in which the signal analyser comprises a threshold detector configured to detect a signal amplitude of the received ultrasound signals and to compare the signal amplitude with a threshold amplitude, and to output the analysis signal in dependence on the comparison; and/or
the signal analyser is configured to identify a feature in the received ultrasound signals and to output the analysis signal in dependence on the identified feature.

5. The scanning system as claimed in claim 4, in which the signal analyser is configured to identify a feature in the received ultrasound signals and to output the analysis signal in dependence on the identified feature, and the threshold detector is configured to detect the amplitude of the identified feature.

6. The scanning system as claimed in claim 3, in which the signal analyser comprises a position detector configured to detect a first transducer position of the first transducer module and a second transducer position of the second transducer module, and to output the analysis signal in dependence on the first transducer position and the second transducer position.

7. The scanning system as claimed in claim 3, in which the signal analyser comprises an overlap detector configured to detect an overlap in the lateral extent of the first transducer module and the second transducer module, based on an analysis of the received ultrasound signals and/or the first transducer position and the second transducer position.

8. The scanning system as claimed in claim 3, in which the controller is configured to further analyse received ultrasound signals based on one or more of:
- detecting that an amplitude of a peak in the received ultrasound signals meets or exceeds a threshold amplitude;
- detecting that an overlap between the first transducer module and the second transducer module meets or exceeds a threshold overlap; and
- detecting that a measure of alignment between the first transducer module and the second transducer module meets or exceeds a threshold measure of alignment.

9. A method of imaging structural features below a surface of an object, the method comprising:
- transmitting ultrasound signals, using a first 2D array of a first transducer module, towards an object, under control of a controller;
- receiving ultrasound signals from the object using the first 2D array, whereby data pertaining to an internal structure of the object can be obtained;
- receiving through-transmission ultrasound signals transmitted by the first transducer module that pass through the object using a second 2D array of a second transducer module; and
- analysing the received ultrasound signals to obtain data pertaining to an internal structure of the object,
- wherein the method comprises generating a trigger signal at a trigger signal generator of the controller, transmitting, by the first transducer module, the ultrasound signals in response to receiving the trigger signal, and, in response to the receiving the trigger signal, receiving the ultrasound signals transmitted by the first transducer module at the second transducer module.

10. The method as claimed in claim 9, comprising transmitting, by the second 2D array, further ultrasound signals towards the object under control of the controller.

11. The method as claimed in claim 9, comprising analysing the received ultrasound signals at a signal analyser of the controller, and outputting an analysis signal by the signal analyser, wherein the controller further analyses the received ultrasound signals based on the analysis signal.

12. The method as claimed in claim 11, comprising
detecting a signal amplitude of the received ultrasound signals by a threshold detector of the signal analyser, comparing the signal amplitude with a threshold amplitude, and outputting the analysis signal in dependence on the comparison; and/or identifying, by the signal analyser, a feature in the received ultrasound signals, and outputting the analysis signal in dependence on the identified feature.

13. The method as claimed in claim 11, comprising identifying, by the signal analyser, a feature in the received ultrasound signals, outputting the analysis signal in dependence on the identified feature and detecting an amplitude of the identified feature by a threshold detector.

14. The method as claimed in claim 11, comprising detecting, at a position detector of the signal analyser, a first transducer position of the first transducer module and a second transducer position of the second transducer module, and outputting the analysis signal in dependence on the first transducer position and the second transducer position.

15. The method as claimed in claim 11, comprising detecting, at an overlap detector of the signal analyser, an overlap in the lateral extent of the first transducer module and the second transducer module, based on an analysis of the received ultrasound signals and/or the first transducer position and the second transducer position.

16. The method as claimed in claim 11, comprising analysing the received ultrasound signals based on one or more of:

detecting that an amplitude of a peak in the received ultrasound signals meets or exceeds a threshold amplitude;

detecting that an overlap between the first transducer module and the second transducer module meets or exceeds a threshold overlap; and detecting that a measure of alignment between the first transducer module and the second transducer module meets or exceeds a threshold measure of alignment.

17. A scanning system configured for through-transmission ultrasound imaging of structural features below a surface of an object, the scanning system comprising:

a controller for interfacing with a plurality of transducer modules;

a first transducer module coupled to the controller and comprising a first 2D array configured to transmit ultrasound signals towards an object under control of the controller and to receive ultrasound signals from the object whereby data pertaining to an internal structure of the object can be obtained; and a second transducer module coupled to the controller and comprising a second 2D array configured to receive through-transmission ultrasound signals transmitted by the first transducer module that pass through the object whereby data pertaining to an internal structure of the object can be obtained, wherein the controller comprises a signal analyser configured to analyse the received ultrasound signals and to output an analysis signal, the controller being configured to further analyse the received ultrasound signals based on the analysis signal, wherein the signal analyser comprises an overlap detector configured to detect an overlap in the lateral extent of the first transducer module and the second transducer module, based on an analysis of the received ultrasound signals and/or the first transducer position and the second transducer position.

18. The scanning system as claimed in claim 17, in which:

the signal analyser comprises a threshold detector configured to detect a signal amplitude of the received ultrasound signals and to compare the signal amplitude with a threshold amplitude, and to output the analysis signal in dependence on the comparison; and/or the signal analyser is configured to identify a feature in the received ultrasound signals and to output the analysis signal in dependence on the identified feature.

19. The scanning system as claimed in claim 17, in which the signal analyser comprises a position detector configured to detect a first transducer position of the first transducer module and a second transducer position of the second transducer module, and to output the analysis signal in dependence on the first transducer position and the second transducer position.

20. The scanning system as claimed in claim 17, in which the second 2D array is configured to transmit further ultrasound signals towards the object under control of the controller.

* * * * *